US00RE49966E

(19) United States
(12) Reissued Patent
Xin et al.

(10) Patent Number: US RE49,966 E
(45) Date of Reissued Patent: May 14, 2024

(54) END TABLE FOR CRATING A PET

(71) Applicant: Merry Products Corporation, Richmond Hill (CA)

(72) Inventors: Kevin Xin, Markham (CA); Jeffrey Pinard, Toronto (CA)

(73) Assignee: Merry Products Corporation, Richmond Hill (CA)

(21) Appl. No.: 29/861,215

(22) Filed: Nov. 28, 2022

Related U.S. Patent Documents

Reissue of:
(64) Patent No.: Des. 903,948
Issued: Dec. 1, 2020
Appl. No.: 29/673,769
Filed: Dec. 18, 2018

(51) LOC (14) Cl. ..... 30-02
(52) U.S. Cl.
USPC ..... D30/108
(58) Field of Classification Search
USPC ..... D30/108, 112, 114, 116; D6/657, 671, D6/671.1
CPC .... A01K 1/015; A01K 1/0029; A01K 1/0245; A01K 1/03; A01K 1/0005
See application file for complete search history.

(56) References Cited

U.S. PATENT DOCUMENTS 6,390,025 B1 * 5/2002 Babcock ..... A01K 1/03 119/482
6,460,486 B1 * 10/2002 Powers ..... A01K 1/0245 119/452
6,997,138 B1 * 2/2006 Simpson ..... A01K 1/033 217/122
D554,389 S * 11/2007 Pierce ..... D30/108
D581,602 S * 11/2008 Jakubowski ..... A01K 1/0245 D30/114
D586,304 S * 2/2009 Robaina ..... D13/184
D609,407 S * 2/2010 Henley ..... A01K 1/033 D30/112
D613,000 S * 3/2010 Ward ..... A01K 1/03 D30/119
D634,078 S * 3/2011 Lee ..... D30/119
D640,837 S * 6/2011 Henley ..... D30/108
7,997,234 B1 * 8/2011 Hughey ..... A01K 1/034 119/500
D704,901 S * 5/2014 Diskin ..... D30/108
(Continued)

OTHER PUBLICATIONS

"Merry Products Single door dog crate & end table", posted Dec. 22, 2018[online], [retrieved Apr. 22, 2020]. Retrieved from internet:https://www.chewy.com/merry-products-slide-aside-single/dp/180904.*

*Primary Examiner* — Philip S Hyder
(74) *Attorney, Agent, or Firm* — Harness, Dickey & Pierce, P.L.C.; Stephen T. Olson

(57) CLAIM

The ornamental design for an end table for crating a pet, as shown.

DESCRIPTION

FIG. 1 is a perspective view of an end table for crating a pet in accordance with our design.
FIG. 2 is a front view thereof.
FIG. 3 is a rear view thereof.
FIG. 4 is a right side view, it being understood that the left side view is a mirror image thereof[; and],.
FIG. 5 is a top view thereof.
The broken lines shown in the drawings depict portions of the end table for crating a pet that form no part of the claimed design.

1 Claim, 5 Drawing Sheets

Matter enclosed in heavy brackets [ ] appears in the original patent but forms no part of this reissue; matter printed in italics indicates the additions made by reissue.

Amended

(56) References Cited

U.S. PATENT DOCUMENTS

| | | | | | |
|---|---|---|---|---|---|
| D723,225 | S | * | 2/2015 | Lee | D30/108 |
| D725,833 | S | * | 3/2015 | Trifiro | D30/119 |
| D821,038 | S | * | 6/2018 | Rathman | D30/114 |
| D852,429 | S | * | 6/2019 | Rathman | D30/114 |
| D853,052 | S | * | 7/2019 | Rathman | D30/114 |
| D855,259 | S | * | 7/2019 | Rathman | D30/114 |
| 10,470,435 | B2 | * | 11/2019 | Fleming | E05D 15/58 |
| 10,750,713 | B2 | * | 8/2020 | Rathman | A01K 1/015 |
| 2006/0000422 | A1 | * | 1/2006 | Cheng | A01K 31/06 119/455 |
| 2006/0112897 | A1 | * | 6/2006 | Moore | A01K 1/033 119/482 |
| 2007/0000447 | A1 | * | 1/2007 | Jakubowski | A01K 31/08 119/453 |
| 2007/0089683 | A1 | * | 4/2007 | Roberts | A01K 31/06 119/477 |
| 2008/0110411 | A1 | * | 5/2008 | Cantrell | A01K 1/034 119/452 |
| 2008/0245313 | A1 | * | 10/2008 | Jakubowski | A01K 1/0245 119/497 |
| 2016/0192615 | A1 | * | 7/2016 | Parness | A01K 5/01 119/454 |
| 2016/0205890 | A1 | * | 7/2016 | Link | E05C 3/042 |
| 2016/0227731 | A1 | * | 8/2016 | Cheng | E05C 1/10 |
| 2016/0348386 | A1 | * | 12/2016 | Beckmann | F16K 17/02 |
| 2017/0055489 | A1 | * | 3/2017 | Bin | A01K 1/033 |
| 2017/0071149 | A1 | * | 3/2017 | Northrop | A01K 1/034 |
| 2018/0142718 | A1 | * | 5/2018 | Zhu | F16B 7/0433 |
| 2019/0191664 | A1 | * | 6/2019 | Xin | A01K 1/033 |

* cited by examiner

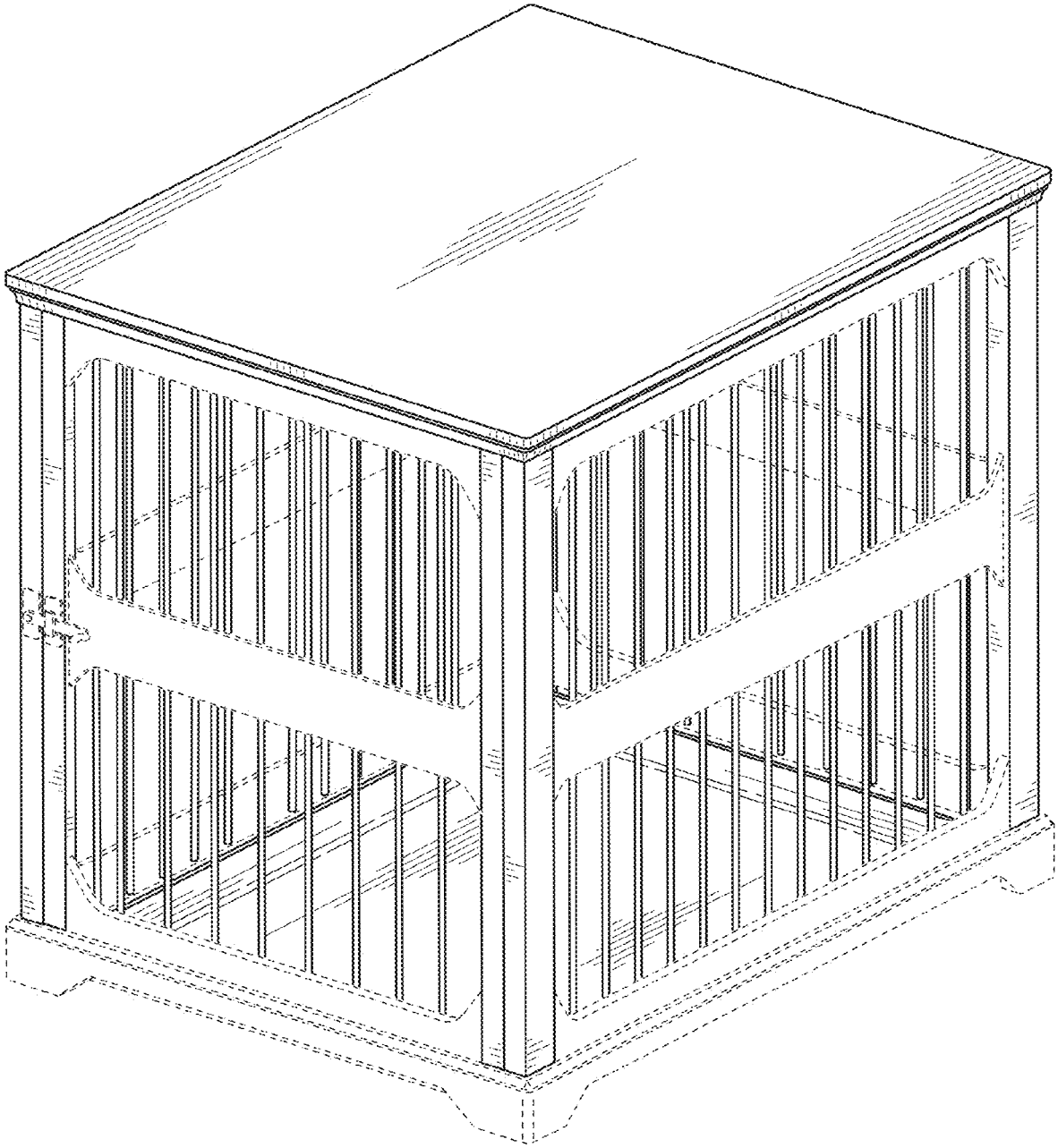
FIG. 1- Amended

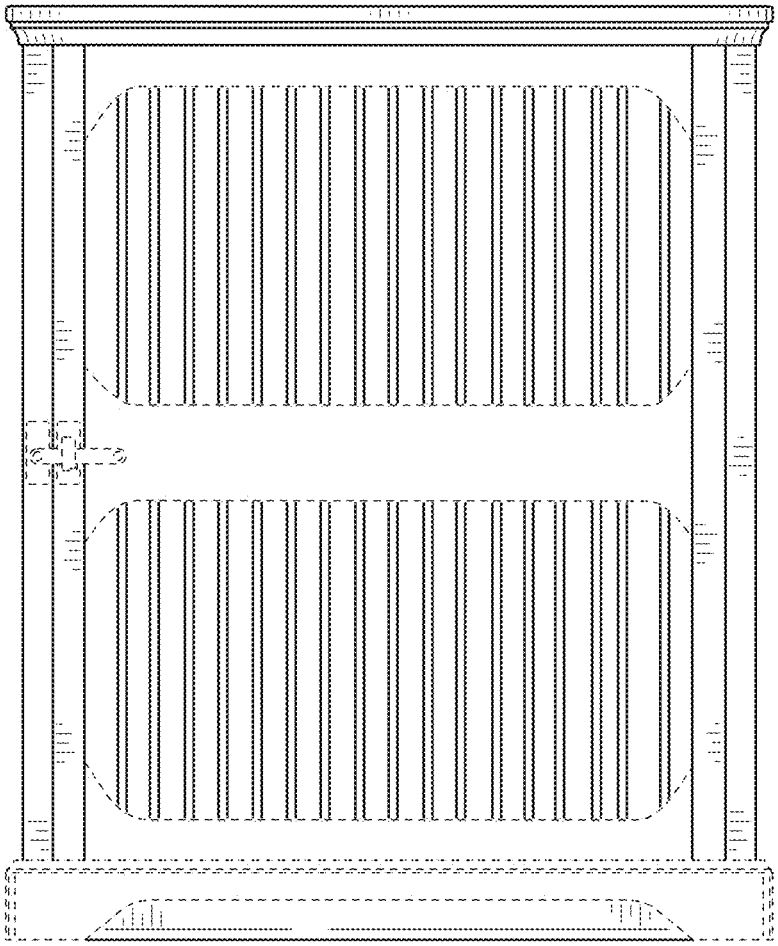
FIG. 2 - Amended

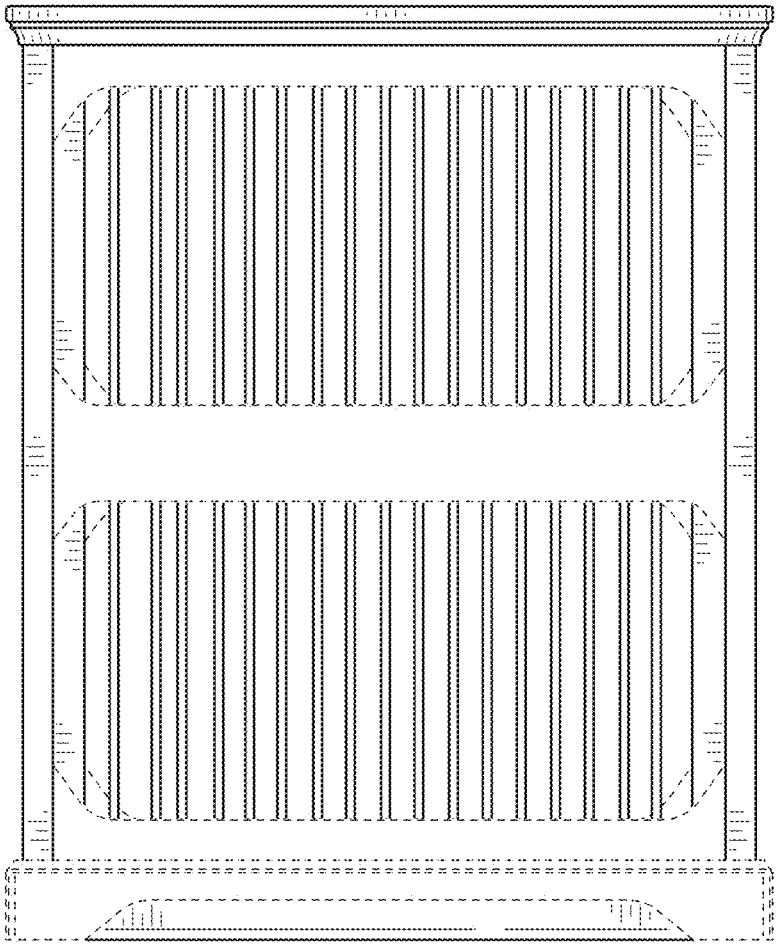
FIG. 3 - Amended

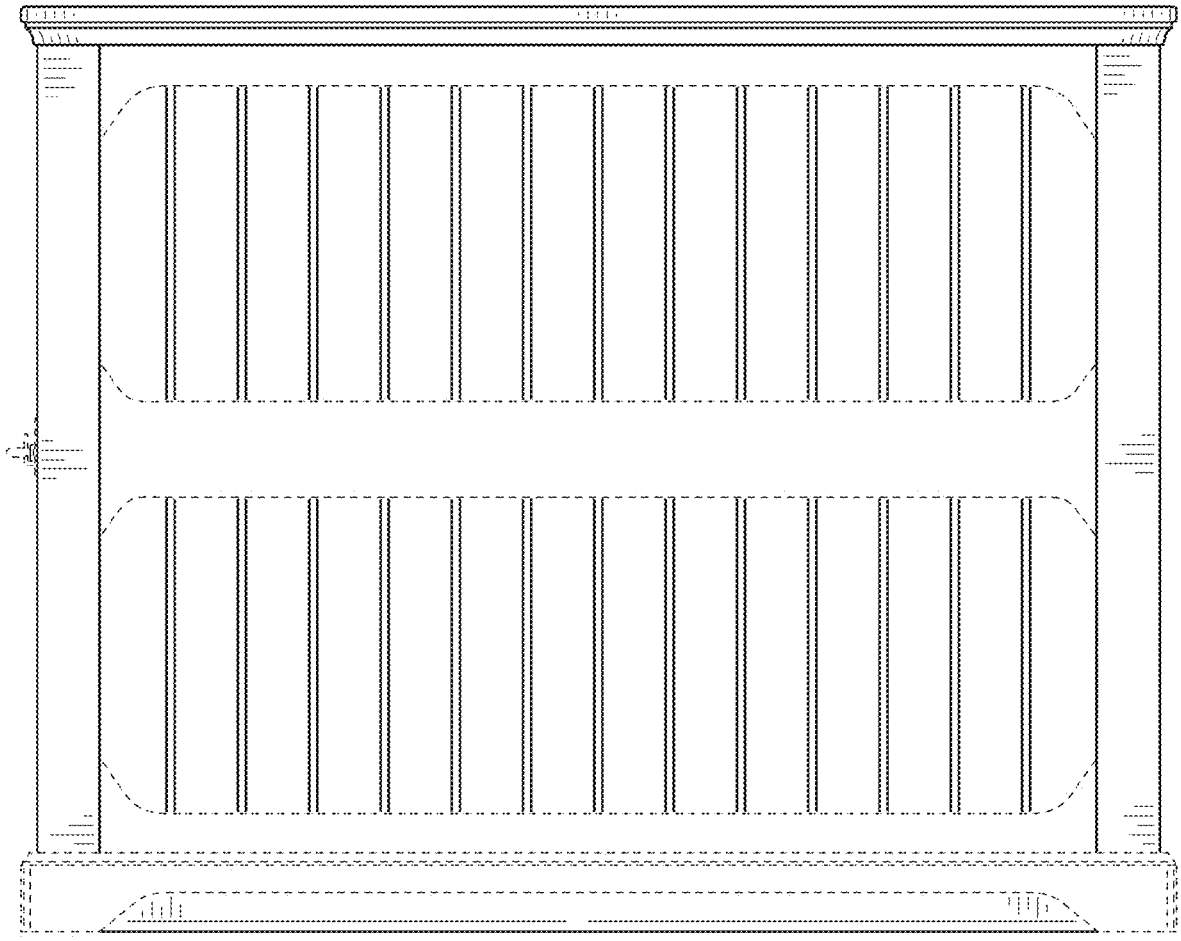
FIG. 4 - Amended

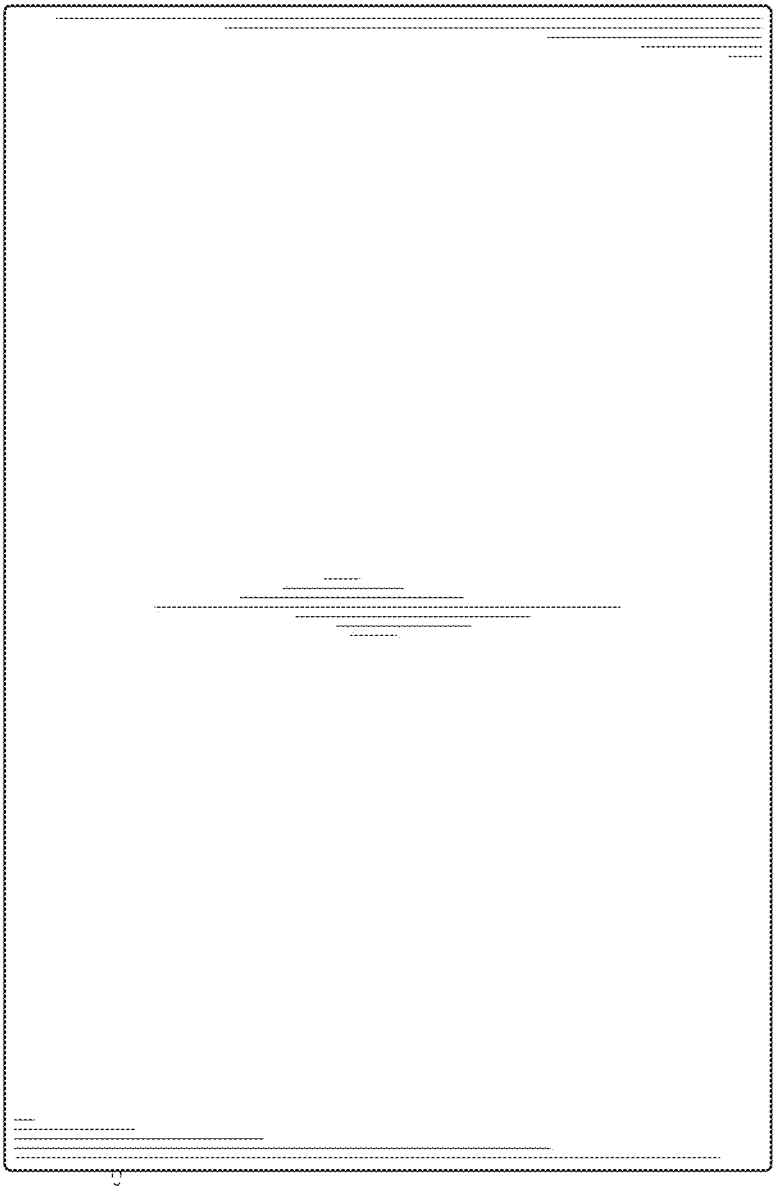
FIG. 5 - Amended